(12) United States Patent
Hou et al.

(10) Patent No.: US 11,001,165 B2
(45) Date of Patent: May 11, 2021

(54) BATTERY PACK HEATING APPARATUS AND METHOD OF BATTERY PACK HEATING CONTROL

(71) Applicant: Contemporary Amperex Technology Co., Limited, Ningde (CN)

(72) Inventors: Yizhen Hou, Ningde (CN); Zhimin Dan, Ningde (CN); Wei Zhang, Ningde (CN); Xiyang Zuo, Ningde (CN); Xingyuan Wu, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 150 days.

(21) Appl. No.: 16/289,413

(22) Filed: Feb. 28, 2019

(65) Prior Publication Data

US 2019/0359082 A1 Nov. 28, 2019

(30) Foreign Application Priority Data

May 22, 2018 (CN) .......................... 201810496455.5

(51) Int. Cl.
*H01M 10/06* (2006.01)
*B60L 58/27* (2019.01)
(Continued)

(52) U.S. Cl.
CPC .............. *B60L 58/27* (2019.02); *B60L 53/16* (2019.02); *B60L 53/62* (2019.02)

(58) Field of Classification Search
CPC ........... H01M 10/6571; H01M 10/625; H01M 10/615
See application file for complete search history.

(56) References Cited

U.S. PATENT DOCUMENTS

2008/0048608 A1* 2/2008 Lim ...................... H02J 7/0025
320/106
2012/0161714 A1* 6/2012 Ishibashi ............... H02J 7/0063
320/135
(Continued)

FOREIGN PATENT DOCUMENTS

CN 102074755 A 5/2011
CN 103419651 A 12/2013
(Continued)

OTHER PUBLICATIONS

Machine translation of First Chinese Office Action, dated Aug. 6, 2019, issued in related Chinese Patent Application No. 201810496455.5, 18 pages.
(Continued)

*Primary Examiner* — Cynthia H Kelly
*Assistant Examiner* — Monique M Wills
(74) *Attorney, Agent, or Firm* — Christensen O'Connor Johnson Kindness PLLC

(57) ABSTRACT

The embodiments of the present disclosure provide a battery pack heating apparatus and a method of battery pack heating control. According to an embodiment of the present disclosure, a battery pack heating apparatus is provided. The battery pack heating apparatus is applicable portably and externally to a vehicle and includes: an electrical energy conversion component, including an energy storage device, a first set of switches and a second set of switches; a heating interface connected to the energy storage device via the first set of switches to form a first heating loop and connected to the energy storage device via the second set of switches to form a second heating loop, the heating interface being configured to be connected to a battery pack of one vehicle; and a heating control module configured to control a direc-
(Continued)

tion of electrical energy transfer between the battery pack and the energy storage device.

20 Claims, 4 Drawing Sheets

(51) Int. Cl.
*B60L 53/62* (2019.01)
*B60L 53/16* (2019.01)

(56) References Cited

U.S. PATENT DOCUMENTS

| | | |
|---|---|---|
| 2012/0280659 A1 | 11/2012 | Xu et al. |
| 2013/0134945 A1 | 5/2013 | Xu et al. |
| 2016/0336561 A1 | 11/2016 | Miyao et al. |
| 2018/0331402 A1* | 11/2018 | Inoue .................. H01M 2/1094 |

FOREIGN PATENT DOCUMENTS

| | | |
|---|---|---|
| CN | 203721843 U | 7/2014 |
| CN | 203721849 U | 7/2014 |
| CN | 105896639 A | 8/2016 |
| CN | 205790286 U | 12/2016 |
| CN | 107666026 A | 2/2018 |
| DE | 10 2015 015 007 A1 | 7/2016 |
| WO | 2013174271 A1 | 11/2013 |

OTHER PUBLICATIONS

Second Chinese Office Action, dated Nov. 29, 2019, issued in related Chinese Patent Application No. 201810496455.5, 10 pages.
European Search Report dated Jul. 17, 2019, issued in corresponding European Application No. 19153070, 6 pages.

* cited by examiner

BATTERY PACK HEATING APPARATUS AND METHOD OF BATTERY PACK HEATING CONTROL

CROSS-REFERENCE TO RELATED APPLICATIONS

The present application claims priority to Chinese Patent Application No. 201810496455.5, filed on May 22, 2018, the content of which is incorporated herein by reference in its entirety.

TECHNICAL FIELD

The present disclosure relates to battery technology, and more particularly, to a battery pack heating apparatus and a method of battery pack heating control.

BACKGROUND

Intelligentization and electrification are ones of important directions in the development of intelligent transportation. Especially in the field of electrification, with the improvement in materials and technologies, energy densities of battery packs are becoming higher and higher. Vehicles are using various types of battery packs as their energy sources. Compared with conventional vehicles that mainly use fossil fuels as energy sources, more and more modern vehicles use battery packs such as lithium batteries as their energy sources. Research data has shown that in the environment of −30° C., the charging and discharging performances of a battery pack becomes basically zero. Hence, it is very important to study battery packs to improve the adaptability of vehicles to the environment. Based on the current phenomenon that a low temperature environment has a significant impact on the performance of the battery pack, it has become a focus of the related art to study how to heat the battery pack.

At present, a device for heating a battery pack is generally a built-in device. Depending on different types of vehicles and battery packs, a heating device such as a heating film or a liquid device is placed inside or outside the battery pack, and the battery pack is heated indirectly by heating the heating device. A power source for the heating device of the battery pack is generally taken from a built-in lead acid battery or Alternate Current (AC) commercial electricity.

However, the existing process for indirectly heating battery packs has a problem of low heating efficiency, e.g., in an electrical automobile.

SUMMARY

In view of this, the embodiments of the present disclosure provide a battery pack heating apparatus and a method of battery pack heating control, capable of solving the problem in the related art that an indirect heating scheme has low heating efficiency.

In a first aspect, according to an embodiment of the present disclosure, a battery pack heating apparatus is provided. The battery pack heating apparatus is applicable portably and externally to a vehicle. The battery pack heating apparatus includes: an electrical energy conversion component, including an energy storage device, a first set of switches and a second set of switches; a heating interface connected to the energy storage device via the first set of switches to form a first heating loop and connected to the energy storage device via the second set of switches to form a second heating loop, the heating interface being configured to be connected to a battery pack of one vehicle; and a heating control module configured to control a direction of electrical energy transfer between the battery pack and the energy storage device.

Further to the above aspect and any of the embodiments, an embodiment is provided, in which the first set of switches includes a first switch device and a second switch device connected to two terminals of the energy storage device, respectively, and the first set of switches, the energy storage device and the heating interface are electrically connected to form the first heating loop; the second set of switches includes a third switch device and a fourth switch device connected to two terminals of the energy storage device, respectively, and the second set of switches, the energy storage device and the heating interface are electrically connected to form the second heating loop.

Further to the above aspect and any of the embodiments, an embodiment is provided, in which the first switch device has a first terminal connected to a first terminal of the energy storage device and a second terminal electrically connected to a positive plate of the heating interface; the second switch device has a first terminal connected to a second terminal of the energy storage device and a second terminal electrically connected to a negative plate of the heating interface; the third switch device has a first terminal connected to a third terminal of the energy storage device and a second terminal electrically connected to the positive plate of the heating interface; and the fourth switch device has a first terminal connected to a fourth terminal of the energy storage device and a second terminal electrically connected to the negative plate of the heating interface.

Further to the above aspect and any of the embodiments, an embodiment is provided, in which the battery pack heating apparatus further includes: a current detector having a first terminal connected to a negative connection terminal of the first set of switches and a negative connection terminal of the second set of switches and a second terminal connected to a negative plate of the heating interface, and configured to detect a current value of the first heating loop or the second heating loop. The heating control module is further configured to obtain the current value detected by the current detector, so as to determine whether an abnormality has occurred based on the current value.

Further to the above aspect and any of the embodiments, an embodiment is provided, in which the battery pack heating apparatus further includes: a fifth switch device having a first terminal connected to a positive plate of the heating interface and a second terminal connected to a positive connection terminal of the first set of switches and a positive connection terminal of the second set of switches, and configured to disable an electrical energy transfer between the battery pack heating apparatus and the battery pack in case of an abnormality.

Further to the above aspect and any of the embodiments, an embodiment is provided, in which the battery pack heating apparatus further includes: a protection circuit including a plurality of switch protection components and a protection capacitor component. Each of the plurality of switch protection components is connected in parallel with one switch device, and configured to reduce a loss or avoid a damage during a switch-off process of the one switch device. The protection capacitor component includes one or more capacitors, and the protection capacitor component is connected in parallel with the first heating loop and the second heating loop and configured to avoid a voltage peak when the first set of switches or the second set of switches is switched on.

Further to the above aspect and any of the embodiments, an embodiment is provided, in which the heating interface is a charging gun.

Further to the above aspect and any of the embodiments, an embodiment is provided, in which the heating control module further includes: an interface state detection circuit configured to detect a voltage at a predetermined connection state detection point, such that the heating control module determines a connection state between the heating interface and the battery pack based on the voltage.

Further to the above aspect and any of the embodiments, an embodiment is provided, in which the interface state detection circuit includes: a first resistor having a first terminal connected to a constant voltage source and a second terminal connected to the heating control module and a first terminal of a detection resistor, the detection resistor having a second terminal grounded and being arranged in a heating socket of the vehicle including the battery pack, the second terminal of the first resistor being the connection state detection point; a second resistor arranged within the heating interface and having a first terminal connected to the second terminal of the first resistor; and a vehicle plug switch arranged within the heating interface and having a first terminal connected to a second terminal of the second resistor and a second terminal grounded.

One of the above solutions has the following advantageous effects.

According to the embodiment of the present disclosure, the electrical energy conversion component and the heating interface in the battery pack heating apparatus are connected in series to form a heating loop, which, in combination with the connection between the heating interface and the battery pack in the vehicle, constitutes a heating loop connected between the energy storage device and the battery pack. Thus, the heating control module controls the direction of electrical energy transfer in the energy storage device, such that electrical energy can be stored and released continuously between the energy storage device and the battery pack. Thus, the electrical energy transfer process generates heat that can directly heat the battery pack. The energy storage device can directly utilize the electrical energy provided by the battery pack, without requiring any additional power source or heating device. In this way, the problem associated with the limited heating efficiency by a low power energy source can be avoided, and the heating efficiency can be improved while saving costs. On the other hand, when compared with the built-in heating device in the related art, the battery pack heating apparatus according to the embodiment of the present disclosure can be applicable portably and externally to the vehicle, such that it can be used to heat not only the vehicle, but also other vehicles, leading to an improve compatibility. Hence, the solution according to the embodiment of the present disclosure can solve the problem in the related art that an indirect heating scheme has low heating efficiency.

In a second aspect, according to an embodiment of the present disclosure, a method of battery pack heating control is provided. The method is applied in the battery pack heating apparatus according to the first aspect and performed by the heating control module. The method includes: controlling an on/off state of the first set of switches and an on/off state of the second set of switches, such that at least one heating sub-cycle is performed in a heating process for the battery pack until a predetermined heating condition is met. The method includes, in each heating sub-cycle: switching on the first set of switches and switching off the second set of switches, such that a first electrical energy transfer is conducted between the energy storage device and the battery pack via the heating interface; and switching off the first set of switches and switching on the second set of switches in response to a predetermined electrical energy transfer condition being met, such that a second electrical energy transfer is conducted between the energy storage device and the battery pack via the heating interface. Each of the first electrical energy transfer and the second electrical energy transfer is charging or discharging and the first electrical energy transfer and the second electrical energy transfer have different directions.

Further to the above aspect and any of the embodiments, an embodiment is provided, in which the method further includes: performing a step of switching on the first set of switches and switching off the second set of switches in a next heating sub-cycle in response to the predetermined electrical energy transfer condition being met.

Further to the above aspect and any of the embodiments, an embodiment is provided, in which the electrical energy transfer condition includes: a predetermined energy storage ratio threshold or electrical energy release threshold of the energy storage device being met; or a predetermined electrical energy transfer time length being reached, the predetermined electrical energy transfer time length comprising a discharging time length of the energy storage device and a charging time length of the energy storage device.

Further to the above aspect and any of the embodiments, an embodiment is provided, in which the method further includes, prior to controlling the on/off state of the first set of switches and the on/off state of the second set of switches, such that at least one heating sub-cycle is performed in the heating process for the battery pack: detecting whether the heating interface is in a fully connected state; and obtaining security detection information of the batter pack in response to detecting that the heating interface is in the fully connected state. The step of controlling the on/off state of the first set of switches and the on/off state of the second set of switches, such that at least one heating sub-cycle is performed in the heating process for the battery pack is performed in response to the security detection information for the battery pack being normal.

Further to the above aspect and any of the embodiments, an embodiment is provided, in which the heating control module further comprises an interface state detection circuit, and the operation of detecting whether the heating interface is in the fully connected state includes: detecting a voltage value at a predetermined connection state detection point in the interface state detection circuit; and detecting that the heating interface is in the fully connected state when the voltage value is a predetermined fully connected voltage value.

Further to the above aspect and any of the embodiments, an embodiment is provided, in which the security detection information includes at least one of insulation impedance detection information, a temperature of the battery pack or a voltage of the battery pack.

Further to the above aspect and any of the embodiments, an embodiment is provided, in which the method further includes: obtaining state information of the battery pack, wherein the state information includes at least one of a voltage, a temperature of the battery pack, insulation impedance information, a state of charge or a current; and disabling an electrical energy transfer between the battery pack and the energy storage device in response to any one or more pieces of state information in the state information being abnormal, so as to stop a current heating process.

Further to the above aspect and any of the embodiments, an embodiment is provided, in which the operation of disabling the electrical energy transfer between the battery pack and the energy storage device includes: switching off the first set of switches and switching off the second set of switches.

Further to the above aspect and any of the embodiments, an embodiment is provided, in which the battery pack heating apparatus further comprises a fifth switch device having a first terminal connected to a positive plate of the heating interface and a second terminal connected to a positive connection terminal of the first set of switches and a positive connection terminal of the second set of switches, and the operation of disabling the electrical energy transfer between the battery pack and the energy storage device includes: switching off the fifth switch device and switching off the first set of switches and the second set of switches.

Further to the above aspect and any of the embodiments, an embodiment is provided, in which the predetermined heating condition includes: the battery pack having a temperature reaching a predetermined heating temperature threshold.

One of the above solutions has the following advantageous effects.

With the method of battery pack heating control according to the embodiment of the present disclosure, the direction of the electrical energy transfer in the electrical energy conversion component can be controlled by controlling the on/off state of each of the first switch device and the second switch device in the electrical energy conversion component. In each heating sub-cycle, the energy storage device receives electrical energy from the battery pack. After the on/off states of the sets of switches are changed, the energy storage device is discharged to the battery pack. As such, by performing a plurality of such heating sub-cycles, the battery pack can continuously store and release energy. In this way, the battery pack can be heated directly by means of charging and discharging. During this process, the energy storage device does not need to be provided with any additional power source or heat source and its energy may come from the battery pack in the electrical vehicle directly. In this way, the problem associated with the limited heating efficiency by a low power energy source can be avoided, and the heating efficiency can be improved while saving costs. On the other hand, when compared with the built-in heating device in the related art, the battery pack heating apparatus according to the embodiment of the present disclosure can be applicable portably and externally to the vehicle, such that it can be used to heat not only the vehicle, but also other vehicles, leading to an improve compatibility. Hence, the solution according to the embodiment of the present disclosure can solve the problem in the related art that an indirect heating scheme has low heating efficiency.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

Figure 1:
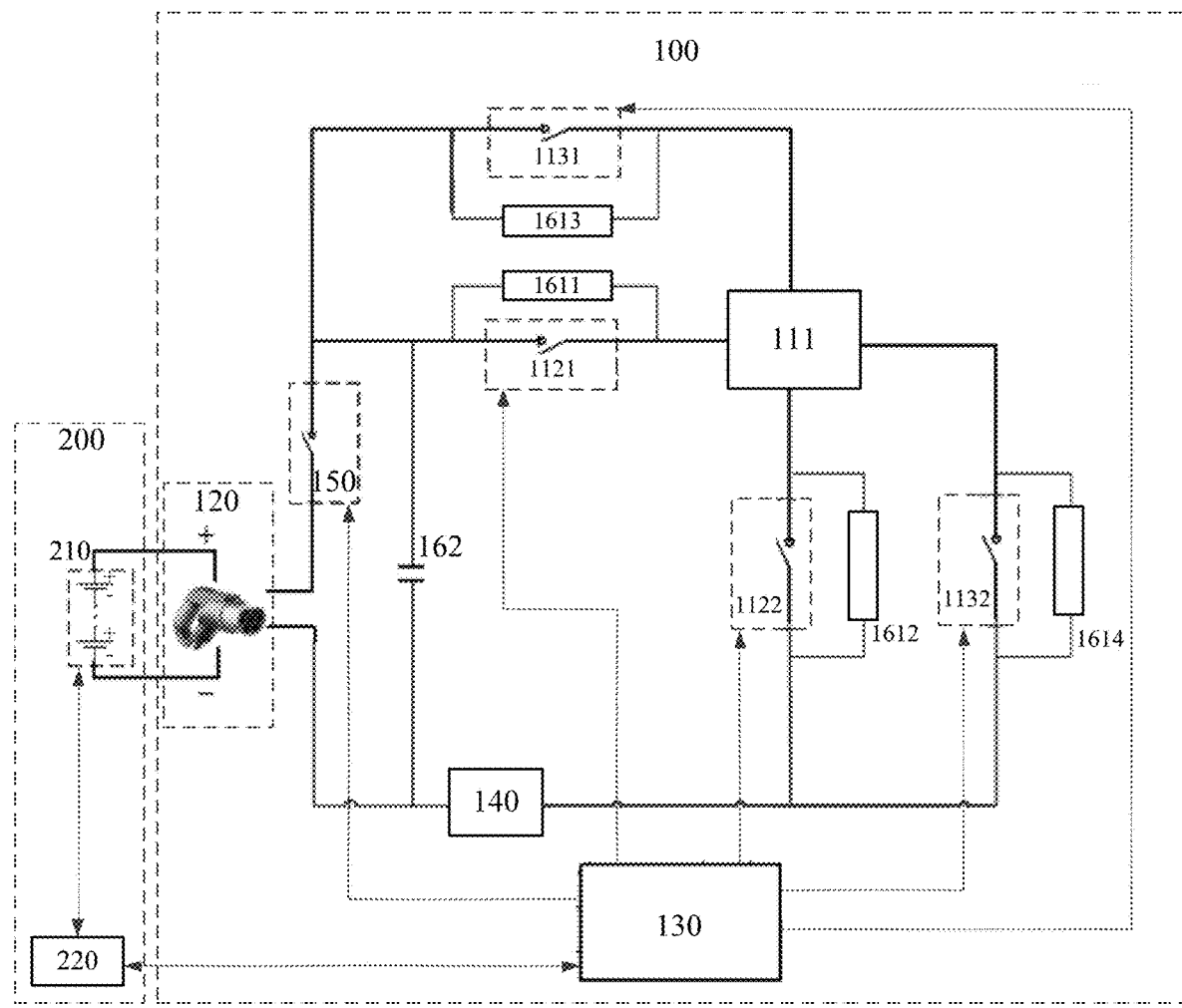
FIG. 1 is a schematic diagram showing a structure of a battery pack heating apparatus according to an embodiment of the present disclosure.

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although a switch device may be described using the terms 'first', 'second', 'third', etc., in the present disclosure, the switch devices should not be limited to these terms. These terms are used only to distinguish the switch devices from each other. For example, without departing from the scope of the embodiments of the present disclosure, a first switch device may also be referred to as a second switch device. Similarly, the second switch device may also be referred to as the first switch device.

Depending on the context, the term "if" as used herein can be interpreted as "when", "in a case where", "in response to determining . . . " or "in response to detecting . . . ". Similarly, depending on the context, the phrase "if it is determined . . . " or "if it is detected . . . (a statement of a condition or event)" can be interpreted as "when it is determined . . . ", "in response to determining . . . ", "when it is detected . . . (a statement of a condition or event)", or "in response to detecting . . . (a statement of a condition or event)".

In order to solve the problem in the related art associated with low heating efficiency due to indirect heating of the battery pack, the following idea is provided according to an embodiment of the present disclosure. A direct heating device including a heating interface and having electrical power coming from a battery pack itself, and a control method thereof, can be provided. The heating device is provided in a space external to a vehicle in a portable manner. During a heating process, energy in the battery pack can be stored and released continuously. During the energy storing and releasing process, the battery pack will be heated continuously, such that battery pack can be heated.

In accordance with the above idea, the following feasible embodiments are provided in the present disclosure.

Embodiment 1

According to an embodiment of the present disclosure, a battery pack heating apparatus is provided. The battery pack heating apparatus can be a portable device that can be provided externally to a vehicle. Here, "externally to a vehicle" means an area outside a housing of the vehicle. Here, the vehicle may include, but not limited to, an electrical automobile, an electrical flying device, an electrical water transportation device or the like. The embodiment of the present disclosure is not limited to this. For the purpose of illustration, for an electrical automobile as an example, the portable battery pack heating apparatus can be provided under, on, in front of or behind the automobile. The embodiment of the present disclosure is not limited to this. For practicality and aesthetics, it can be provided portably under the automobile.

Referring to FIG. 1, the battery pack heating apparatus 100 includes:

an electrical energy conversion component 110, including an energy storage device 111, a first set of switches 112 (the reference numeral is not shown in FIG. 1) and a second set of switches 113 (the reference numeral is not shown in FIG. 1);

a heating interface 120 connected to the energy storage device 111 via the first set of switches 112 to form a first heating loop and connected to the energy storage device 111 via the second set of switches 113 to form a second heating loop, the heating interface 120 being connected to a battery pack (shown in FIG. 1 as 210) of one vehicle (shown in FIG. 1 as 200); and a heating control module 130 configured to control a direction of electrical energy transfer between the battery pack 210 and the energy storage device 111.

Here, the energy storage device is a device that can be configured to receive and output electrical energy. The direction of electrical energy transfer with the electrical energy conversion component may include the battery pack releasing electrical energy and the energy storage device storing electrical energy (the battery pack charging the energy storage device) or the battery pack storing electrical energy and the energy storage device releasing energy (the energy storage device charging the battery pack). The embodiment of the present disclosure is not limited to any form of energy storage device. For example, the form of the energy storage device may include, but not limited to, a combination of one or more energy storage devices connected in series or in parallel, or a portable mobile power source device.

When the battery pack heating apparatus is heating the battery pack, the heating control module can control the battery pack to charge the energy storage device in the electrical energy conversion component, and then control the energy storage device to be discharged to the battery pack. The above control process is performed continuously and cyclically until a predetermined heating condition is met. As such, the heating control module only needs to control the direction of electrical energy transfer in the electrical energy conversion component. In this electrical energy transfer process that is performed cyclically, the battery pack stores and releases electrical energy continuously, which will generate heat for directly heating the battery pack.

In an embodiment of the present disclosure, the heating interface may have a form of a charging gun. The charging gun can be connected to a charging socket in an electrical vehicle and connected to a battery pack via the charging socket. By using a charging gun as the heating interface, the need for providing an additional interface can be avoided. Further, it can be compatible with most of electrical vehicles, which greatly improves the compatibility of the battery pack heating apparatus and extends its application scenarios.

Figure 2:
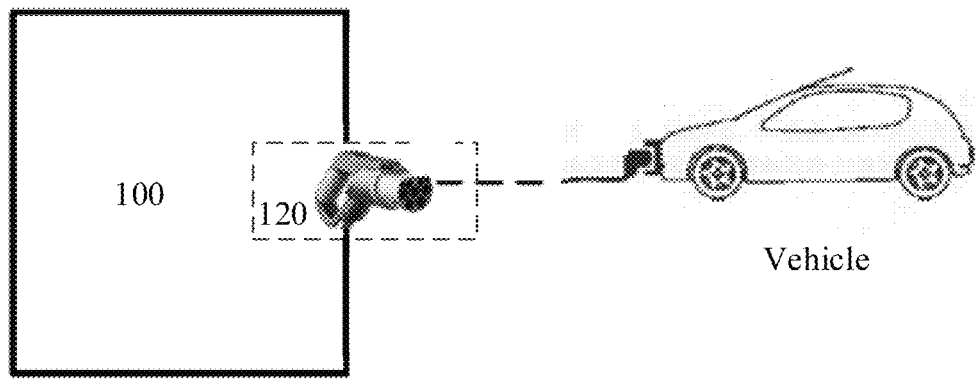
FIG. 2 is a schematic diagram showing connectivity between a battery pack heating apparatus according to an embodiment of the present disclosure and electrical vehicles.

Here, referring to the connectivity between the heating interface and the electrical vehicle as shown in FIG. 2, the battery pack heating apparatus includes one heating interface (charging gun). Hence, the heating interface is used to heat the battery pack of one vehicle at a time. It is to be noted here that the vehicle shown in FIG. 2 may or may not be the vehicle including the battery pack heating apparatus, i.e., may be a third party vehicle. This can met the heating requirements of the battery packs of the vehicle including the battery pack heating apparatus and other vehicles, thereby providing an improved compatibility.

In order to explain the implementation of the solution in detail, referring to the structure shown in FIG. 1, the respective components of the battery pack heating apparatus will be described in detail.

Figure 3:
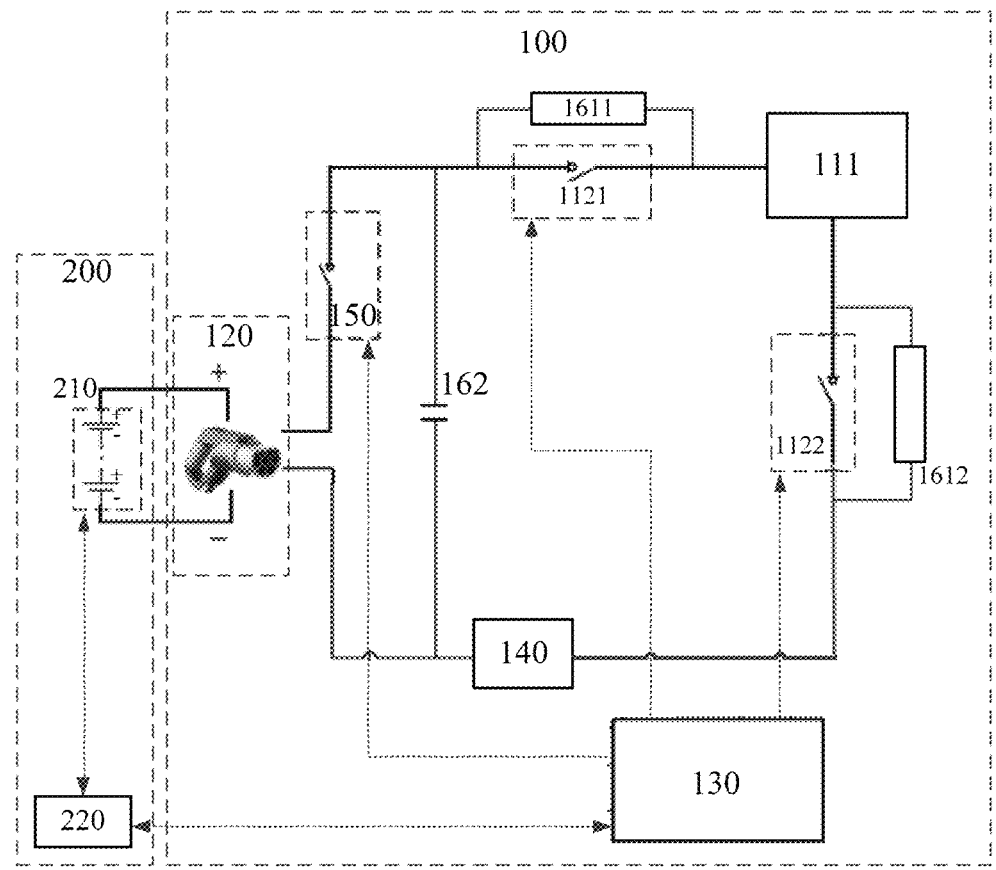
FIG. 3 is a schematic diagram showing a structure of a first heating loop in a battery pack heating apparatus according to an embodiment of the present disclosure.
Figure 4:
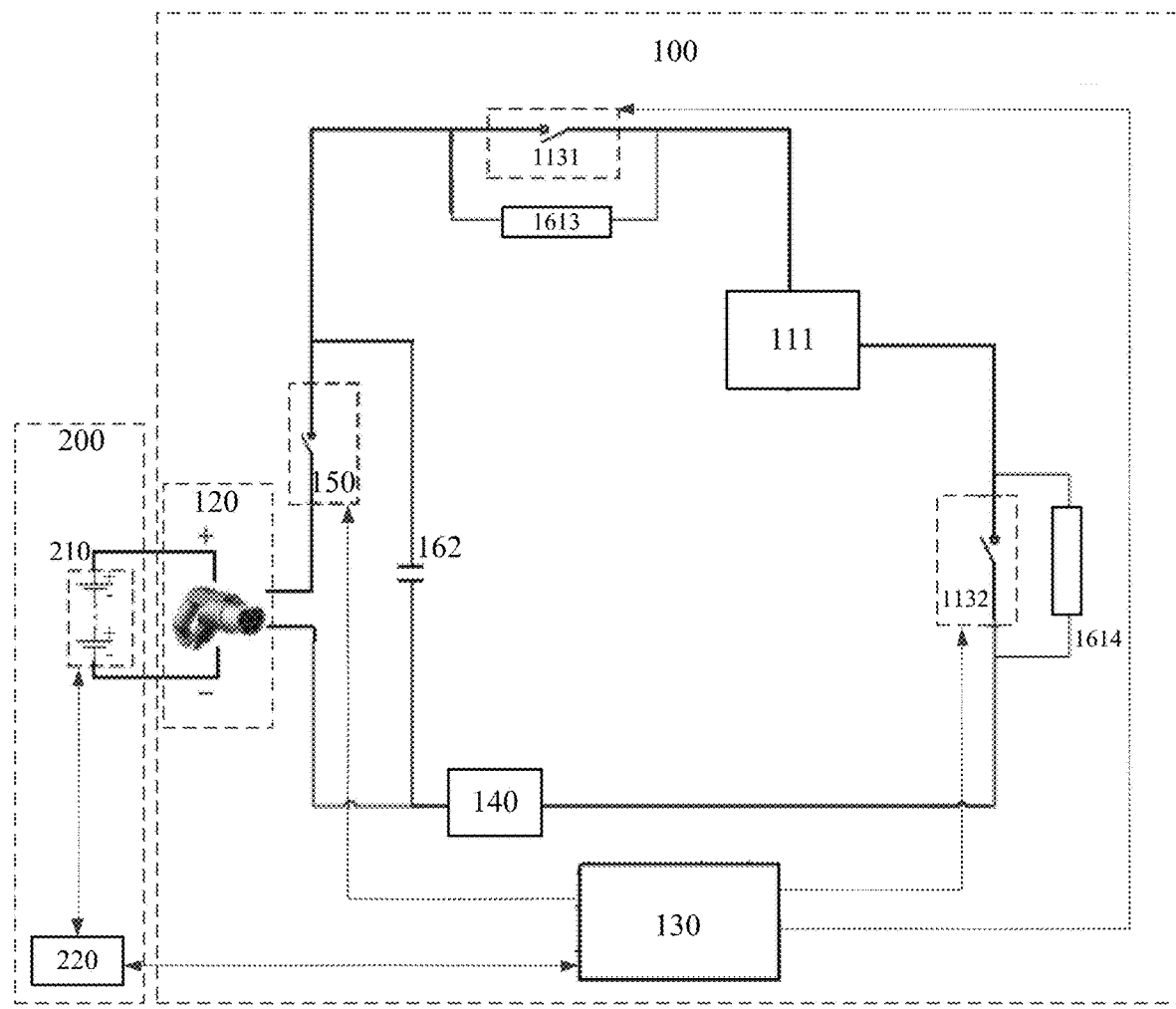
FIG. 4 is a schematic diagram showing a structure of a second heating loop in a battery pack heating apparatus according to an embodiment of the present disclosure.

In this case, referring to the structures shown in FIG. 3 and FIG. 4, FIG. 3 is a schematic diagram showing a structure of a first heating loop formed in the battery pack heating apparatus. As shown in FIG. 3, the first set of switches includes a first switch device 1121 and a second switch device 1122 connected to two terminals of the energy storage device 111, respectively. The first set of switches 112, the energy storage device 111 and the heating interface 120 are electrically connected to form the first heating loop.

FIG. 4 is a schematic diagram showing a structure of a second heating loop in the battery pack heating apparatus. As shown in FIG. 4, the second set of switches includes a third switch device 1131 and a fourth switch device 1132 connected to two terminals of the energy storage device 111, respectively. The second set of switches 113, the energy storage device 111 and the heating interface 120 are electrically connected to form the second heating loop.

It is to be noted here that the electrical connection as used herein means that electrical devices can be electrically connected either directly or indirectly. This also applies to all references to "electrical connection" hereinafter.

For the purpose of illustration, the embodiment of the present disclosure further gives the connectivity of the first set of switches and the second set of switches. As shown in FIG. 1 and FIG. 3, in the first set of switches 112, the first switch device 1121 has a first terminal connected to a first terminal of the energy storage device 111 and a second terminal electrically connected to a positive plate of the heating interface 120. The second switch device 1122 has a first terminal connected to a second terminal of the energy storage device 111 and a second terminal electrically connected to a negative plate of the heating interface 120. As such, the first switch device 1121, the energy storage device 111, the second switch device 1122 and the heating interface 120 are electrically connected to constitute the complete first heating loop.

As shown in FIG. 1 and FIG. 4, in the second set of switches 113, the third switch device 1131 has a first terminal connected to a third terminal of the energy storage device 111 and a second terminal electrically connected to the positive plate of the heating interface 120. The fourth switch device 1132 has a first terminal connected to a fourth terminal of the energy storage device 111 and a second terminal electrically connected to the negative plate of the heating interface 120. As such, the third switch device 1131, the energy storage device 111, the fourth switch device 1132 and the heating interface 120 are electrically connected to constitute the complete second heating loop.

In this way, in a practical heating process, the on/off state of the first set of switches and the on/off state of the second set of switches can be controlled, such that at least one heating sub-cycle is performed in a heating process for the battery pack until a predetermined heating condition is met. Here, the predetermined heating condition can be set as desired. In an implementation, a heating temperature threshold can be set and the heating can be stopped when the temperature of the battery pack reaches the preset heating temperature threshold.

Here, the on/off state of the first set of switches is opposite to the on/off state of the second set of switches. That is, when the first set of switches is switched on, the second set of switches is switched off. When the first set of switches is switched off, the second set of switches is switched on.

Hence, in each heating sub-cycle, the first set of switches can be switched on and the second set of switches can be switched off, such that a first electrical energy transfer is conducted between the energy storage device and the battery pack via the heating interface. The first set of switches is switched off and the second set of switches is switched on in response to a predetermined electrical energy transfer condition being met, such that a second electrical energy transfer is conducted between the energy storage device and the battery pack via the heating interface.

It is to be noted here that each of the first electrical energy transfer and the second electrical energy transfer is charging or discharging. In the embodiment of the present disclosure, the first electrical energy transfer and the second electrical energy transfer have different electrical energy transfer directions. That is, when the electrical energy transfer direction of the first electrical energy transfer is that the battery pack charges the energy storage device, the electrical energy transfer direction of the second electrical energy transfer is that the energy storage device charges the battery pack, or vice versa.

Further, in response to the predetermined electrical energy transfer condition being met during the second electrical energy transfer, a step of entering a next heating sub-cycle, i.e., switching on the first set of switches and switching off the second set of switches, is performed.

In this way, cyclically, the battery pack can be heated directly.

In the embodiment of the present disclosure, a security problem can be further considered. Hence, in an implementation, a corresponding security protection measure is taken. That is, state information of the battery pack can be obtained, and the electrical energy transfer between the battery pack and the energy storage device can be disabled in response to any one or more pieces of state information in the state information being abnormal, so as to stop a current heating process.

Here, in the embodiment of the present disclosure, the state information may include, but not limited to, at least one of a voltage, a temperature of the battery pack, insulation impedance information, a state of charge or a current.

It is to be noted here that the condition information referred to in the security protection measure taken during the battery pack heating process may or may not be the same as the condition information referred to in the security protection measure taken before the battery pack heating process, as appropriate. The condition for determining the abnormality in the condition information before the battery pack heating process may or may not be the same as that for determining the abnormality in the condition information during the battery pack heating process.

For example, in a practical scenario, the heating control module can collect information on heating conditions of the respective switch devices, such that a protection measure can be taken in case of an abnormal heating condition in any of the switch devices. Here, as a non-limiting example, the information on the heating conditions of the respective switch devices can be collected by thermistors provided on surfaces of the respective switch devices.

As another example, in another implementation, for the controllability of the heating speed and the security, the electrical energy conversion component can further include a current detector for collecting a current value in the heating loop during the electrical energy transfer process. In this way, when an abnormality occurs, e.g., when the current is abnormal, or when the heating speed is too high or too slow, a protection measure can be taken timely.

In this case, as shown in FIGS. 1, 3 and 4, the battery pack heating apparatus 100 can further include: a current detector 140 having a first terminal connected to a negative connection terminal of the first set of switches 112 and a negative connection terminal of the second set of switches 113 and a second terminal connected to a negative plate of the heating interface 120, and configured to detect a current value of a branch in which it is located. The heating control module 130 is further configured to obtain the current value detected by the current detector 140, so as to determine whether an abnormality has occurred based on the current value.

When the heating control module detects an abnormality, it can take a protection measure, including disconnecting the battery pack heating apparatus from the battery pack. In particular, it may include switching off the first set of switches and the second set of switches.

In a practical application scenario, there may be a case where at least four switch devices are not switched off timely. Hence, a main loop switch can be provided in a main loop of the battery pack heating apparatus, such that the main loop switch can be switched off immediately in case of an abnormality. The main loop switch can be provided at the positive plate of the heating interface.

For the purpose of illustration, FIGS. 1, 3 and 4 show implementations in which the main loop switch is connected to the negative plate of the heating interface. As shown in FIG. 1, the battery pack heating apparatus 100 further includes a fifth switch device 150 having a first terminal connected to the positive plate of the heating interface 120 and a second terminal connected to a positive connection terminal of the first set of switches and a positive connection terminal of the second set of switches, and configured to disable an electrical energy transfer between the battery pack heating apparatus and the battery pack in case of an abnormality. It can be appreciated that the fifth switch device 150 is also controlled by the heating control module 130. The heating control module is configured to detect an abnormality and switch off the fifth switch device 150 first in response to detecting the abnormality. In this way, the electrical energy transfer between the energy storage device 111 and the battery pack 210 can be cut off timely. Then, both the first set of switches and the second set of switches can be switched off.

Further, referring to FIGS. 1, 3 and 4, since a switch-off loss or an overvoltage damage due to a voltage exceeding a maximum voltage may occur during the process of switching off the switch devices, the electrical energy conversion component 110 may further include a protection circuit 160 (the reference numeral is not shown in FIGS. 1, 3 and 4). Here, the protection circuit may include a switch protection component 161 (the reference numeral is not shown in FIGS. 1, 3 and 4) and a protection capacitor component 162.

Here, in the switch protection component 161 (the reference numeral is not shown in FIGS. 1, 3 and 4), each switch protection component is connected in parallel with one switch device, and configured to reduce a loss or avoid a damage during a switch-off process of the switch device.

As shown in FIGS. 1, 3 and 4, the electrical energy conversion component 110 has four switch protection components: a first switch protection component 1611 connected in parallel with the first switch device 1121, a second switch protection component 1612 connected in parallel with the second switch device 1122, a third switch protection component 1613 connected in parallel with the third switch device 1131, and a fourth switch protection component 1614 connected in parallel with the fourth switch device 1132.

Each of the switch protection components in the embodiment of the present disclosure can be an RCD absorption circuit including a resistor Rs, a capacitor Cs and a diode VDs. Depending on the connectivity among the respective electrical devices in the RCD absorption circuit, different effects can be achieved.

For example, an RCD absorption circuit having the diode and the capacitor connected in series and the resistor connected in parallel with the diode can slow the rising of voltage when the power tube is switched off, thereby reducing the switch-off loss.

In another example, an RCD absorption circuit having the diode and the capacitor connected in series and the resistor connected in parallel with the capacitor can limit the maximum voltage when the power tube is switched off, thereby preventing the power tube from damage due to switch-off overvoltage.

Further, as shown in FIGS. 1, 3 and 4, the specific connectivity and function of the protection capacitor component 162 are as follows.

The protection capacitor component 162 includes one or more capacitors. The protection capacitor component 162 is connected in parallel with the first heating loop and the second heating loop and configured to avoid a voltage peak when the first set of switches or the second set of switches is switched on.

In an embodiment of the present disclosure, the protection capacitor component 162 can include one or more capacitors. For the purpose of illustration, FIG. 1 shows connectivity of the protection capacitor component 162 including only one capacitor. When the protection capacitor component 162 includes a plurality of capacitors, the plurality of capacitors can be connected with each other in series and/or in parallel.

Here, when the battery pack heating apparatus includes a current detector, referring to FIGS. 1, 3 and 4, the protection capacitor component 162 has a first terminal connected to the positive connection terminal of the first switch component and the positive connection terminal of the second switch component, and a second terminal connected to the second terminal of the current detector 140. The first terminal of the current detector 140 is connected to the negative connection terminal of the first set of switches and the negative connection terminal of the second set of switches.

It can be appreciated that, when the battery pack heating apparatus 100 includes no current detector, the protection capacitor component 162 has a first terminal connected to the positive connection terminal of the first switch component and the positive connection terminal of the second switch component, and a second terminal connected to the negative connection terminal of the first set of switches and the negative connection terminal of the second set of switches.

Further, in a practical industrial application process, the protection capacitor component can arranged as close to the first set of switches and the second set of switches as possible and as far away from the battery pack as possible, so as to reduce the impact of and parasitic parameters of the wiring and the device on the capacitor as much as possible, thereby reducing security risks.

In the embodiment of the present disclosure, the heating interface may have a form of a charging gun. The battery pack heating apparatus can be coupled to a charging socket in an electrical vehicle via the charging gun, so as to be connected to the battery pack.

For security reasons, the battery pack heating apparatus needs to start operating when the heating interface and the battery pack are in a fully connected state.

In light of this, an interface state detection circuit can be provided in the heating control module of the battery pack heating apparatus. The interface state detection circuit is configured to detect a voltage at a predetermined detection point, such that the heating control module can determine a connection state between the heating interface and the battery pack based on the voltage.

Figure 5:
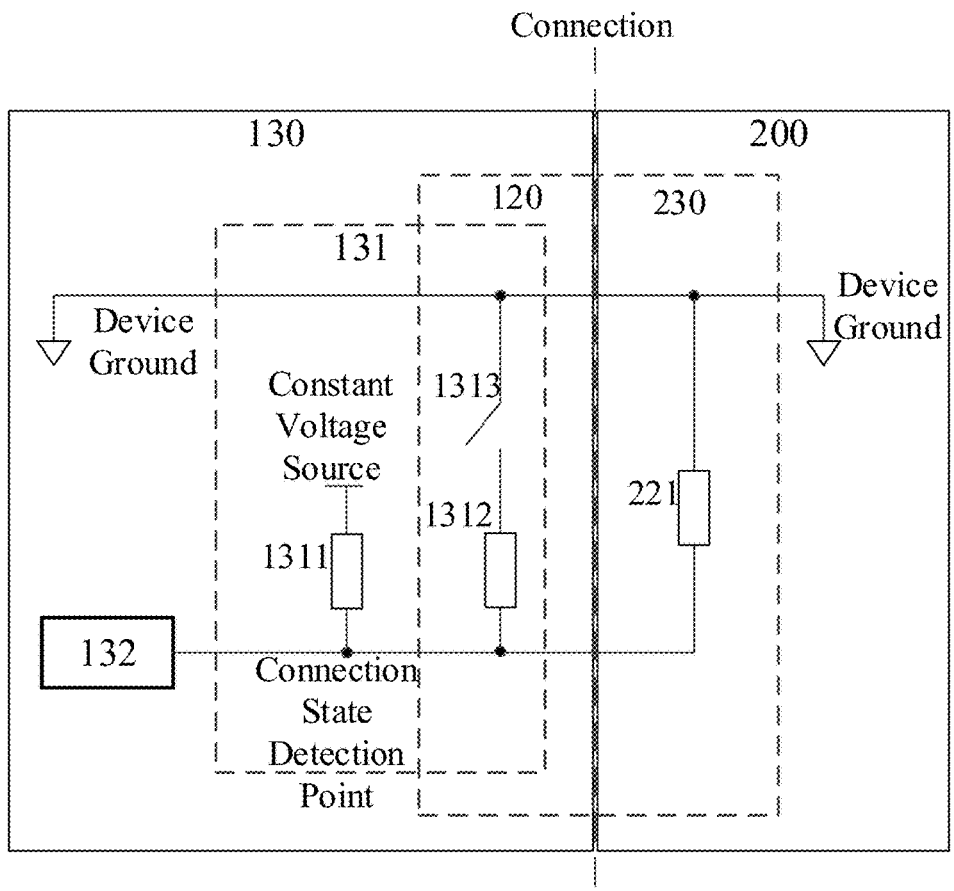
FIG. 5 is a schematic diagram showing a structure of an interface state detection circuit provided in a heating control module of a battery pack heating apparatus according to an embodiment of the present disclosure.

In particular, a specific structure of the interface state detection circuit provided in the heating control module of the battery pack heating apparatus is shown in FIG. 5. The heating control module 130 shown in FIG. 5 includes an interface state detection circuit 131 and another portion 132. The present disclosure is not limited to any specific structure of the other portion 132, which may include, but not limited to, a processor in an implementation.

As shown in FIG. 5, the interface state detection circuit 131 includes:

a first resistor 1311 having a first terminal connected to a constant voltage source and a second terminal connected to the heating control module 130 and a first terminal of a detection resistor 221, the detection resistor 221 having a second terminal grounded and being arranged in a heating socket 230 of the vehicle 200 including the battery pack 210, the second terminal of the first resistor 1311 being the connection state detection point;

a second resistor 1312 arranged within the heating interface 120 and having a first terminal connected to the second terminal of the first resistor 1311; and a vehicle plug switch 1313 arranged within the heating interface 120 and having a first terminal connected to a second terminal of the second resistor 1312 and a second terminal grounded.

In the following, an exemplary scenario in which the interface state detection circuit 131 is applied to a 12V constant voltage source as shown in FIG. 3 will be described.

When the heating interface 120 is not connected to the vehicle 200, the vehicle plug switch 1313 is switched on. In this case, the first resistor 1311 and the second resistor 1312 are connected in series and the voltage at the connection state detection point is 6V.

When the charging gun is not connected to a cable, the vehicle plug switch 1313 is switched off and the voltage at the connection state detection point is 12V.

When the charging gun is partially connected to the charging socket of the vehicle, the vehicle plug switch 1313 is switched off. In this case, the first resistor 1311 and the detection resistor 221 are connected in parallel and the voltage at the connection state detection point is 6V.

When the charging gun is fully connected to the charging socket of the vehicle, the vehicle plug switch 1313 is released and kept switched on. In this case, the charging gun is fully connected to the charging socket of the vehicle, the second resistor 1312 is connected in parallel with the detection resistor 221 and then in series with the first resistor 1311, and the voltage at the connection state detection point is 4V.

Hence, in the entire process of the charging gun of the battery pack heating apparatus interfacing with the charging socket of the vehicle, the voltage at the connection state detection point is changed from 6V to 12V, then to 6V and finally to 4V. Accordingly, when the voltage at the connection state detection point is detected to be 4V, it is detected that the connection state between the heating interface and the battery pack is the fully connected state.

As an electrical vehicle is typically provided with a Battery Management System (BMS), the BMS can be used to collect security performance related parameters, such as the temperature, voltage and insulation impedance of the battery pack. These parameters can assist the heating control module in security decision and protection for the battery pack heating apparatus.

Hence, in a practical implementation, as shown in FIGS. 1, 3 and 4, the heating control module 130 is further connected to the BMS 220 of the vehicle 200 communicatively. The communication can include, but not limited to, Controller Area Network (CAN) bus communications.

In a practical implementation, the current value collected by the current detector can be transmitted to the BMS and forwarded by the BMS to the heating control module, or can be transmitted directly to the heating control module and further forwarded by the heating control module to the BMS, such that they can take their respective protection measures.

Regarding the control method performed by the heating control module that has not been described in the embodiment of the present disclosure, reference can be made to a method of battery pack heating control according to Embodiment 2.

The solution according to the embodiment of the present disclosure has the following advantageous effects.

According to the embodiment of the present disclosure, the electrical energy conversion component and the heating interface in the battery pack heating apparatus are connected in series to form a heating loop, which, in combination with the connection between the heating interface and the battery pack in the vehicle, constitutes a heating loop connected between the energy storage device and the battery pack. Thus, the heating control module controls the direction of electrical energy transfer in the energy storage device, such that electrical energy can be stored and released continuously between the energy storage device and the battery pack. Thus, the electrical energy transfer process generates heat that can directly heat the battery pack. The energy storage device can directly utilize the electrical energy provided by the battery pack, without requiring any additional power source or heating device. In this way, the problem associated with the limited heating efficiency by a low power energy source can be avoided, and the heating efficiency can be improved while saving costs. On the other hand, when compared with the built-in heating device in the related art, the battery pack heating apparatus according to the embodiment of the present disclosure can be applicable portably and externally to the vehicle, such that it can be used to heat not only the vehicle, but also other vehicles, leading to an improve compatibility. Hence, the solution according to the embodiment of the present disclosure can solve the problem in the related art that an indirect heating scheme has low heating efficiency.

Embodiment 2

Based on the battery pack heating apparatus according to the above Embodiment 1, a method of battery pack heating control and a computer readable storage medium are provided according to an embodiment of the present disclosure.

The method of battery pack heating control can be applied in the battery pack heating apparatus according to Embodiment 1 and can be performed by the heating control module.

The method of battery pack heating control according to the embodiment of the present disclosure includes: controlling an on/off state of the first set of switches and an on/off state of the second set of switches, such that at least one heating sub-cycle is performed in a heating process for the battery pack until a predetermined heating condition is met.

Figure 6:
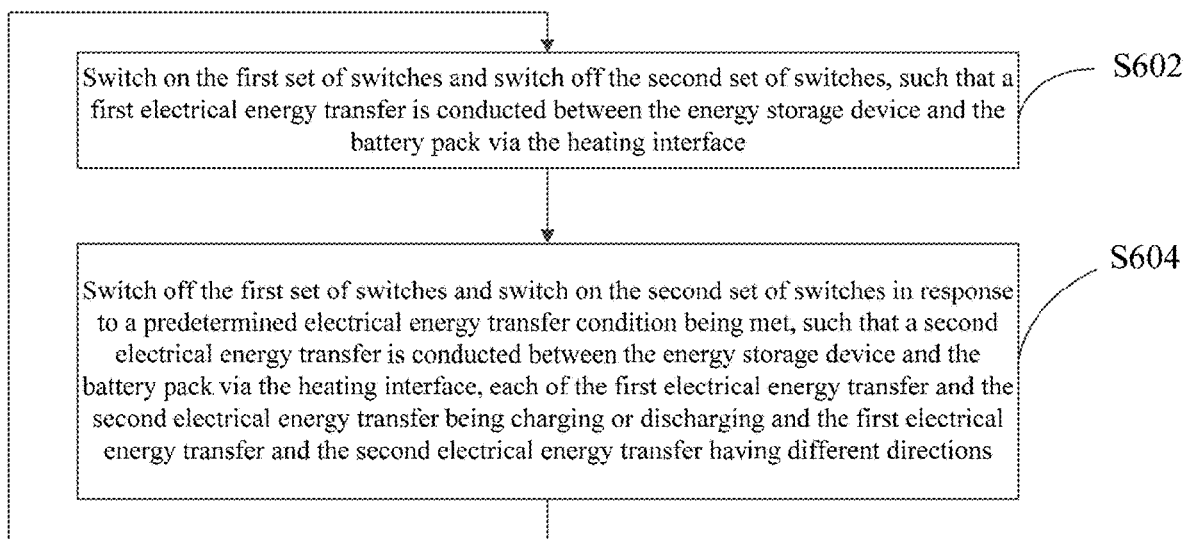
FIG. 6 is a flowchart illustrating a method of battery pack heating control according to an embodiment of the present disclosure.

Here, referring to FIG. 6, the method control includes the following steps in each heating sub-cycle.

At S602, the first set of switches is switched on and the second set of switches is switched off, such that a first electrical energy transfer is conducted between the energy storage device and the battery pack via the heating interface.

Here, in the embodiment of the present disclosure, a set of switches is switched on when all switch devices in the set are switched on, and a set of switches is switched off when all switch devices in the set are switched off.

At S604, the first set of switches is switched off and the second set of switches is switched on in response to a predetermined electrical energy transfer condition being met, such that the a second electrical energy transfer is conducted between the energy storage device and the battery pack via the heating interface. Here, each of the first electrical energy transfer and the second electrical energy transfer is charging or discharging and the first electrical energy transfer and the second electrical energy transfer have different electrical energy transfer directions. That is, when the electrical energy transfer direction of the first electrical energy transfer is that the energy storage device is charged and the battery pack is discharged, the electrical energy transfer direction of the second electrical energy transfer is that the energy storage device is discharged and the battery pack is charged. On the other hand, when the electrical energy transfer direction of the first electrical energy transfer is that the energy storage device is discharged and the battery pack is charged, the electrical energy transfer direction of the second electrical energy transfer is that the energy storage device is charged and the battery pack is discharged.

As such, in a heating sub-cycle, the energy storage device stores and releases electrical energy continuously. Correspondingly, the battery pack connected to the heating interface releases and stores electrical energy continuously. In this electrical energy transfer process, the battery pack generates heat continuously until a predetermined heating condition is met and the above heating sub-cycle is stopped then.

In particular, before the step S602 in the first heating sub-cycle, the first set of switches and the second set of switches are both switched off.

When the step S604 has been performed in any heating sub-cycle and it is required to determine when to enter a next heating sub-cycle, the method can further include: performing a step S602 of switching on the first set of switches and switching off the second set of switches in a next heating sub-cycle in response to the predetermined electrical energy transfer condition being met.

Here, the electrical energy transfer condition in the embodiment of the present disclosure can be predetermined as desired. For the purpose of illustration, two examples of the predetermined electrical energy transfer condition are described below according to the embodiment of the present disclosure.

In a first example, the predetermined electrical energy transfer condition is that a predetermined energy storage ratio threshold or electrical energy release threshold of the energy storage device is met.

In performing this step, it is required to monitor in real time the energy storage ratio of the electrical energy received by the energy storage device to the electrical energy stored therein. Accordingly, it is determined that the energy storage requirement is met in response to the energy storage ratio reaches the predetermined energy storage ratio threshold. Here, the energy storage ratio threshold can be set to an almost full status.

In a second example, the predetermined electrical energy transfer condition is that a predetermined electrical energy transfer time length is reached. The predetermined electrical energy transfer time length includes a discharging time length of the energy storage device and a charging time length of the energy storage device.

In performing this step, a timing function is started when the energy storage device starts storing energy. When the timing length reaches the charging time length of the energy storage device, a switching between the step S602 and the step S604 is performed, such that the energy storage device releases energy. The timing function is started again when the energy storage device starts releasing energy. When the timing length reaches the discharging time length of the energy storage device, a switching between the step S602 and the step S604 is performed again, such that the energy storage device stores energy. The above steps are performed cyclically to perform switching between the respective heating sub-cycles and switching between two switching steps in each heating sub-cycle. The charging time length may or may not be the same as the discharging time length and the present disclosure is not limited thereto. The charging time length can be constant or may increase or decrease. The present disclosure is not limited to this.

In the embodiment of the present disclosure, in order to ensure the security of the heating process, before performing the above control method in at least one heating sub-cycle, the following steps are required:

detecting whether the heating interface is in a fully connected state;

obtaining the security detection information for the battery pack in response to detecting that the heating interface is in the fully connected state; and performing the step of controlling the on/off state of the first set of switches and the on/off state of the second set of switches in response to the security detection information for the battery pack being normal, such that at least one heating sub-cycle is performed in the heating process for the battery pack.

Here, the heating interface can be a charging gun and can be interfaced with a charging socket provided in the electrical vehicle so as to be connected to the battery pack. The connection state between the charging gun and the charging socket may include three states: fully connected, partially connected and unconnected.

For a heating interface that is to be connected to the battery pack, the security of the charging/discharging process can only be guaranteed when they are in the fully connected state. A heating interface that is not to be connected to a battery pack needs to be shorted such that the other connected battery packs can be connected in series.

In particular, when the battery pack heating apparatus further includes an interface state detection circuit connected to the heating control module, the operation of detecting whether the heating interface is in the fully connected state may include: detecting a voltage value at a predetermined connection state detection point in the interface state detection circuit; and detecting that the heating interface is in the fully connected state when the voltage value is a predetermined fully connected voltage value.

Here, reference can be made to the above description of FIG. 5 given in Embodiment 1 and details thereof will be omitted here.

When it is detected that the heating interface is in the fully connected state, the security detection information of each battery pack is obtained so as to determine that the battery pack is in a normal state based on the security detection information, thereby further improving the security of the heating process.

Here, in the embodiment of the present disclosure, the security detection information includes, but not limited to, insulation impedance detection information.

In addition, it may include other security detection information, including at least one of a temperature of the battery pack or a voltage of the battery pack. It is to be noted here that a battery pack in a low temperature environment may have a low temperature and the temperature detection in this step may have a low secure temperature range, so as to determine to apply the heating control method based on the temperature of the battery pack in the low temperature environment. Similarly, for the voltage of the battery pack, a secure voltage range can be predetermined based on a low temperature environment and details thereof will be omitted here.

In a feasible implementation, the security detection information of the battery pack can be collected by a BMS of the vehicle where the battery pack is installed. In this case, in performing the control method, the heating control module can instruct the BMS to transmit the security detection information collected by the BMS to the heating control module by communicating with the BMS. In this way, the heating control module can obtain the security detection information of the battery pack without any additional hardware for collection, which can simplify the structure of the device and can reduce the costs.

It is to be noted here that, before performing any heating sub-cycle in the control method, it is required to turn off relays in a main loop for each individual battery pack, including a main positive relay connected to a positive electrode of the battery pack and a main negative relay connected to a negative electrode of the battery pack, so as to ensure that the heat loop can be formed between the electrical energy conversion component and the battery pack. The operation of turning off the relays in the main loop is typically performed by a BMS of the battery pack. Then, before performing the step S602 or when determining to perform the step S602 after the above security detection, the heating control module can transmit to the BMS corresponding to the battery pack an instruction to turn off the relays in the main loop, such that the BMS can turn off the relays in the main loop of the battery pack in response to the instruction.

In the embodiment of the present disclosure, a security problem can be further considered. Hence, in an implementation, a corresponding security protection measure is taken, which may include the following steps of:

obtaining state information of the battery pack; and disabling an electrical energy transfer between the battery pack and the energy storage device in response to any one or more pieces of state information in the state information being abnormal, so as to stop a current heating process.

Here, in the embodiment of the present disclosure, the state information may include, but not limited to, at least one of a voltage, a temperature of the battery pack, insulation impedance information, a state of charge or a current.

It is to be noted here that the condition information referred to in the security protection measure taken during the battery pack heating process may or may not be the same as the condition information referred to in the security protection measure taken before the battery pack heating process, as appropriate. The condition for determining the abnormality in the condition information before the battery pack heating process may or may not be the same as that for determining the abnormality in the condition information during the battery pack heating process.

Hence, in a specific implementation, depending on the structure of the battery pack heating apparatus, the following schemes can be used for disabling the electrical energy transfer between the battery pack and the energy storage device.

In a first scheme, the first set of switches is switched off and the second set of switches is switched off.

In a second scheme, when the battery pack heating apparatus further includes a fifth switch device having a first terminal connected to a positive plate of the heating interface and a second terminal connected to a positive connection terminal of the first set of switches and a positive connection terminal of the second set of switches, the operation of disabling the electrical energy transfer between the battery pack and the energy storage device may include: switching off the fifth switch device and switching off the first set of switches and the second set of switches.

When the heating interface detects an abnormality, it can switch off the fifth switch device immediately and switch off both the first set of switches and the second set of switches. This protection measure can avoid the problem of untimely switching off at least two switches in the first set of switches and the second set of switches to some extent, and can disable the electrical energy transfer between the battery pack and its heating device immediately, so as to reduce the heating security risk.

In the embodiment of the present disclosure, at least one heating sub-cycle is performed repeatedly by controlling the on/off state of the first set of switches and the on/off state of the second set of switches. Each heating sub-cycle includes an electrical energy releasing process and an electrical energy storing process of the battery pack. The battery pack is heated by the heat generated during the energy releasing and storing processes, until the predetermined heating condition is met.

In particular, the heating condition can be predetermined as a predetermined heating temperature threshold of the battery pack being reached. In this case, a heating temperature threshold can be set for each individual battery in the battery pack. The heating temperature thresholds for the respective batteries in the battery pack may or may not be the same. When different heating temperature thresholds are set, the predetermined heating condition can be one of the individual batteries having a temperature reaching its heating temperature threshold.

Here, in a practical implementation, the heating control module can receive a heating temperature of the battery pack transmitted from a BMS, so as to allow the heating control module to monitor, determine and protect the heating process.

Based on the above method of battery pack heating control, according to an embodiment of the present disclosure, a computer readable storage medium is provided. The computer readable storage medium contains computer executable instructions which, when executed, perform the method of battery pack heating control according to any of the above embodiments.

For details of the system structure that are not described in the embodiment of the present disclosure, reference can be made to Embodiment 1.

The solution according to the embodiment of the present disclosure has the following advantageous effects.

With the method of battery pack heating control according to the embodiment of the present disclosure, the direction of the electrical energy transfer in the electrical energy conversion component can be controlled by controlling the on/off state of each of the first switch device and the second switch device in the electrical energy conversion component. In each heating sub-cycle, the energy storage device receives electrical energy from the battery pack. After the on/off states of the sets of switches are changed, the energy storage device is discharged to the battery pack. As such, by performing a plurality of such heating sub-cycles, the battery pack can continuously store and release energy. In this way, the battery pack can be heated directly by means of charging and discharging. During this process, the energy storage device does not need to be provided with any additional power source or heat source and its energy may come from the battery pack in the electrical vehicle directly. In this way, the problem associated with the limited heating efficiency by a low power energy source can be avoided, and the heating efficiency can be improved while saving costs. On the other hand, when compared with the built-in heating device in the related art, the battery pack heating apparatus according to the embodiment of the present disclosure can be applicable portably and externally to the vehicle, such that it can be used to heat not only the vehicle, but also other vehicles, leading to an improve compatibility. Hence, the solution according to the embodiment of the present disclosure can solve the problem in the related art that an indirect heating scheme has low heating efficiency.

It can be appreciated by those skilled in the art that, for the operations of the above described systems, apparatuses and units, reference can be made to the corresponding processes described in connection with the above method embodiments and details thereof will be omitted here for the sake of convenience and simplicity.

It can be appreciated from the embodiments of the present disclosure that the disclosed systems, apparatuses methods can be implemented in alternative ways. The apparatus embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, each of these units can be a separate unit, or two or more units can be integrated into one unit. Such integrated unit can be implemented in hardware, possibly in combination with software functional units.

The above integrated units, when implemented in software function units, can be stored in a computer readable storage medium. The software function units can be stored in a storage medium, which may be any of various mediums capable of storing program codes, such as a USB disk, a mobile hard disk, a Read Only Memory (ROM), a Random Access Memory (RAM), a magnetic disk or an optical disc or the like, containing instructions which cause a computer device (which can be a personal computer, a server, a network device or the like) to perform at least a portion of the steps of the methods according to the embodiments of the present disclosure.

While the preferred embodiments of the present disclosure have been described above, the scope of the present disclosure is not limited thereto. Various modifications, equivalent alternatives or improvements can be made by those skilled in the art without departing from the scope of the present disclosure. These modifications, equivalent alternatives and improvements are to be encompassed by the scope of the present disclosure.

What is claimed is:

1. A battery pack heating apparatus, applicable portably and externally to a vehicle, comprising:
    an electrical energy conversion component, comprising an energy storage device, a first set of switches and a second set of switches;
    a heating interface connected to the energy storage device via the first set of switches to form a first heating loop and connected to the energy storage device via the second set of switches to form a second heating loop, the heating interface being configured to be connected to a battery pack of one vehicle; and
    a heating control module configured to control a direction of electrical energy transfer between the battery pack and the energy storage device.

2. The battery pack heating apparatus of claim 1, wherein the first set of switches comprises a first switch device and a second switch device connected to two terminals of the energy storage device, respectively, and the first set of switches, the energy storage device and the heating interface are electrically connected to form the first heating loop, and the second set of switches comprises a third switch device and a fourth switch device connected to two terminals of the energy storage device, respectively, and the second set of switches, the energy storage device and the heating interface are electrically connected to form the second heating loop.

3. The battery pack heating apparatus of claim 2, wherein the first switch device has a first terminal connected to a first terminal of the energy storage device and a second terminal electrically connected to a positive plate of the heating interface,
    the second switch device has a first terminal connected to a second terminal of the energy storage device and a second terminal electrically connected to a negative plate of the heating interface,
    the third switch device has a first terminal connected to a third terminal of the energy storage device and a second terminal electrically connected to the positive plate of the heating interface, and
    the fourth switch device has a first terminal connected to a fourth terminal of the energy storage device and a second terminal electrically connected to the negative plate of the heating interface.

4. The battery pack heating apparatus of claim 1, further comprising:
    a current detector having a first terminal connected to a negative connection terminal of the first set of switches and a negative connection terminal of the second set of switches and a second terminal connected to a negative plate of the heating interface, and configured to detect a current value of the first heating loop or the second heating loop,
    wherein the heating control module is further configured to obtain the current value detected by the current detector, so as to determine whether an abnormality has occurred based on the current value.

5. The battery pack heating apparatus of claim 1, further comprising:
    a switch device having a first terminal connected to a positive plate of the heating interface and a second terminal connected to a positive connection terminal of the first set of switches and a positive connection terminal of the second set of switches, and configured to disable an electrical energy transfer between the battery pack heating apparatus and the battery pack in case of an abnormality.

6. The battery pack heating apparatus of claim 1, further comprising:
    a protection circuit comprising a plurality of switch protection components and a protection capacitor component,
    wherein each of the plurality of switch protection components is connected in parallel with one switch device, and configured to reduce a loss or avoid a damage during a switch-off process of the one switch device, and
    the protection capacitor component comprises one or more capacitors, and the protection capacitor component is connected in parallel with the first heating loop and the second heating loop and configured to avoid a voltage peak when the first set of switches or the second set of switches is switched on.

7. The battery pack heating apparatus of claim 1, wherein the heating interface is a charging gun.

8. The battery pack heating apparatus of claim 1, wherein the heating control module further comprises:

an interface state detection circuit configured to detect a voltage at a predetermined connection state detection point, such that the heating control module determines a connection state between the heating interface and the battery pack based on the voltage.

9. The battery pack heating apparatus of claim 8, wherein the interface state detection circuit comprises:
   a first resistor having a first terminal connected to a constant voltage source and a second terminal connected to the heating control module and a first terminal of a detection resistor, the detection resistor having a second terminal grounded and being arranged in a heating socket of the vehicle including the battery pack, the second terminal of the first resistor being the connection state detection point;
   a second resistor arranged within the heating interface and having a first terminal connected to the second terminal of the first resistor; and
   a vehicle plug switch arranged within the heating interface and having a first terminal connected to a second terminal of the second resistor and a second terminal grounded.

10. A method of battery pack heating control, applied in the battery pack heating apparatus according to claim 1 and performed by the heating control module, the method comprising:
   controlling an on/off state of the first set of switches and an on/off state of the second set of switches, such that at least one heating sub-cycle is performed in a heating process for the battery pack until a predetermined heating condition is met,
   wherein the method comprises, in each heating sub-cycle:
   closing the first set of switches and switching off the second set of switches, such that a first electrical energy transfer is conducted between the energy storage device and the battery pack via the heating interface; and
   switching off the first set of switches and switching on the second set of switches in response to a predetermined electrical energy transfer condition being met, such that a second electrical energy transfer is conducted between the energy storage device and the battery pack via the heating interface,
   wherein each of the first electrical energy transfer and the second electrical energy transfer is charging or discharging and the first electrical energy transfer and the second electrical energy transfer have different directions.

11. The method of claim 10, further comprising:
   performing a step of switching on the first set of switches and switching off the second set of switches in a next heating sub-cycle in response to the predetermined electrical energy transfer condition being met.

12. The method of claim 10, wherein the electrical energy transfer condition comprises:
   a predetermined energy storage ratio threshold or electrical energy release threshold of the energy storage device being met; or
   a predetermined electrical energy transfer time length being reached, the predetermined electrical energy transfer time length comprising a discharging time length of the energy storage device and a charging time length of the energy storage device.

13. The method of claim 11, wherein the electrical energy transfer condition comprises:
   a predetermined energy storage ratio threshold or electrical energy release threshold of the energy storage device being met; or
   a predetermined electrical energy transfer time length being reached, the predetermined electrical energy transfer time length comprising a discharging time length of the energy storage device and a charging time length of the energy storage device.

14. The method of claim 10, further comprising, prior to controlling the on/off state of the first set of switches and the on/off state of the second set of switches, such that at least one heating sub-cycle is performed in the heating process for the battery pack:
   detecting whether the heating interface is in a fully connected state; and
   obtaining security detection information of the batter pack in response to detecting that the heating interface is in the fully connected state,
   wherein the step of controlling the on/off state of the first set of switches and the on/off state of the second set of switches, such that at least one heating sub-cycle is performed in the heating process for the battery pack is performed in response to the security detection information for the battery pack being normal.

15. The method of claim 14, wherein the heating control module further comprises an interface state detection circuit, and said detecting whether the heating interface is in the fully connected state comprises:
   detecting a voltage value at a predetermined connection state detection point in the interface state detection circuit; and
   detecting that the heating interface is in the fully connected state when the voltage value is a predetermined fully connected voltage value.

16. The method of claim 14, wherein the security detection information comprises at least one of insulation impedance detection information, a temperature of the battery pack or a voltage of the battery pack.

17. The method of claim 10, further comprising:
   obtaining state information of the battery pack, wherein the state information comprises at least one of a voltage, a temperature of the battery pack, insulation impedance information, a state of charge or a current; and
   disabling an electrical energy transfer between the battery pack and the energy storage device in response to any one or more pieces of state information in the state information being abnormal, so as to stop a current heating process.

18. The method of claim 17, wherein said disabling the electrical energy transfer between the battery pack and the energy storage device comprises:
   switching off the first set of switches and switching off the second set of switches.

19. The method of claim 17, wherein the battery pack heating apparatus further comprises a switch device having a first terminal connected to a positive plate of the heating interface and a second terminal connected to a positive connection terminal of the first set of switches and a positive connection terminal of the second set of switches, and said disabling the electrical energy transfer between the battery pack and the energy storage device comprises:
   switching off the switch device and switching off the first set of switches and the second set of switches.

20. The method of claim 10, wherein the predetermined heating condition comprises: the battery pack having a temperature reaching a predetermined heating temperature threshold.

* * * * *